US008849468B2

(12) United States Patent
Abts et al.

(10) Patent No.: US 8,849,468 B2
(45) Date of Patent: Sep. 30, 2014

(54) METHOD OF CONTROLLING THE IRRIGATION OF A FIELD WITH A CENTER PIVOT IRRIGATION SYSTEM

(75) Inventors: Kevin Abts, Omaha, NE (US); Nick Emanuel, North Bend, NE (US)

(73) Assignee: Cropmetrics, LLC, North Bend, NE (US)

( * ) Notice: Subject to any disclaimer, the term of this patent is extended or adjusted under 35 U.S.C. 154(b) by 467 days.

(21) Appl. No.: 13/292,465

(22) Filed: Nov. 9, 2011

(65) Prior Publication Data

US 2013/0116836 A1    May 9, 2013

(51) Int. Cl.
G05D 11/00 (2006.01)
A01G 25/09 (2006.01)
A62C 31/00 (2006.01)
B05B 7/00 (2006.01)
B05B 3/00 (2006.01)

(52) U.S. Cl.
CPC .................................. A01G 25/092 (2013.01)
USPC ................ 700/284; 239/1; 239/61; 239/443; 239/728

(58) Field of Classification Search
None
See application file for complete search history.

(56) References Cited

U.S. PATENT DOCUMENTS

| | | | |
|---|---|---|---|
| 3,628,729 A * | 12/1971 | Thomas | 239/729 |
| 3,979,062 A | 9/1976 | Christensen et al. | |
| 4,161,292 A * | 7/1979 | Holloway et al. | 239/11 |
| 4,249,698 A * | 2/1981 | Smith et al. | 239/1 |
| 4,301,682 A | 11/1981 | Everest | |
| 4,420,265 A | 12/1983 | Everest et al. | |
| 4,463,906 A | 8/1984 | Reinke et al. | |
| 4,522,338 A * | 6/1985 | Williams | 239/729 |
| 4,876,647 A | 10/1989 | Gardner et al. | |
| 5,246,164 A | 9/1993 | McCann et al. | |
| 5,539,637 A | 7/1996 | Upchurch et al. | |
| 5,678,771 A | 10/1997 | Chapman | |
| 5,927,603 A * | 7/1999 | McNabb | 239/63 |
| 6,236,907 B1 | 5/2001 | Hauwiller et al. | |
| 6,401,742 B1 * | 6/2002 | Cramer et al. | 137/78.3 |
| 6,666,384 B2 | 12/2003 | Prandi | |
| 6,947,811 B2 | 9/2005 | Addink et al. | |
| 7,610,122 B2 | 10/2009 | Anderson | |
| 7,660,698 B1 | 2/2010 | Seelig et al. | |
| 2002/0100814 A1 | 8/2002 | Pollak et al. | |
| 2002/0167587 A1 | 11/2002 | Ogasawara | |
| 2002/0170229 A1 | 11/2002 | Ton et al. | |
| 2003/0183018 A1 | 10/2003 | Addink et al. | |
| 2004/0093912 A1 | 5/2004 | Krieger et al. | |

(Continued)

OTHER PUBLICATIONS

"Second Annual Four Corners Irrigation Workshop", Jun. 21 and 22, Farmington, NM, pp. 94.*

(Continued)

Primary Examiner — Kavita Padmanabhan
Assistant Examiner — Thomas Stevens
(74) Attorney, Agent, or Firm — Dennis L. Thomte; Thomte Patent Law Office LLC

(57) ABSTRACT

A method of optimizing water applications of a center pivot irrigation system. The field is mapped to determine the yield potentials of various parts of the field. The field map is divided into sectors or zones and the yield potentials of those sectors or zones are determined. The number of sectors or zones to be irrigated is dependent upon the water flow available to the irrigation system. Only those sectors or zones which can receive adequate irrigating water to achieve the predetermined water application depth will be irrigated.

6 Claims, 3 Drawing Sheets

(56) References Cited

U.S. PATENT DOCUMENTS

| | | | |
|---|---|---|---|
| 2004/0200363 A1* | 10/2004 | Andersen et al. | 99/485 |
| 2005/0156066 A1 | 7/2005 | Ivans | |
| 2006/0027677 A1 | 2/2006 | Abts | |
| 2006/0030990 A1 | 2/2006 | Anderson et al. | |
| 2006/0102734 A1 | 5/2006 | Ivans | |
| 2006/0102739 A1 | 5/2006 | Ivans | |
| 2006/0131442 A1 | 6/2006 | Ivans | |
| 2007/0042803 A1 | 2/2007 | Anderson | |
| 2007/0273394 A1 | 11/2007 | Tanner et al. | |
| 2008/0097654 A1 | 4/2008 | Marian | |

OTHER PUBLICATIONS

Bernardo et al., "An Irrigation Model for Management of Limited Water Supplies", Western Journal, 1987, 10 pages.*

Pair et al., "Center-Pivot Sprinkler Systems", 1973, 4 pgs.*

MacDonald-M.,"Center Pivot Irrigation System Analysis Using Airborne Remotely Sensed Imagery: A Commercial Remote Sensing Case Study", IEEE, 3 pages.*

* cited by examiner

METHOD OF CONTROLLING THE IRRIGATION OF A FIELD WITH A CENTER PIVOT IRRIGATION SYSTEM

BACKGROUND OF THE INVENTION

1. Field of the Invention

This invention relates to a method of controlling the irrigation of a field with a center pivot irrigation system during times of drought or during times of reduced water availability.

2. Description of the Related Art

A center pivot irrigation system travels around a field in a circular manner. Certain parts of the field have greater yield potentials than other parts of the field due to variables such as soil texture, topography of the field, etc. If an unlimited irrigation water supply is available to the irrigator, all areas of the field, regardless of their yield potential, will receive sufficient water to produce whatever yield is possible. A problem arises when the water supply is limited due to the water availability or times of drought. If the same amount of available water is applied to all areas of the field, regardless of the yield potential thereof, no part of the field will receive enough water to produce any crop at all. It is therefore desirable to provide sufficient water to those parts of the field having the greatest yield potential with sufficient water while not applying any water to the parts of the field having lower yield potential. The difficulty of that strategy is to determine those parts of the field to which adequate water may be applied and to determine those parts of the field having the greatest yield potential.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The method of controlling the irrigation of a field during times of drought or during times of reduced water availability with a center pivot irrigation system is disclosed. The first step in the method is to determine the number of acres of the field over which the center pivot irrigation system travels. The next step is to prepare a map which divides the field into irrigation sectors or zones. The number of acres in each of the irrigation sectors or zones are then determined. The yield potential of the field in each of the irrigation sectors or zones is determined. The next step is to determine the crop water requirement and then to determine the water flow rate, in gallons per minute, available to the center pivot irrigation system. The next step is to determine the number of gallons per minute per acre to achieve the crop water requirement. The number of acres available to receive sufficient water to achieve the crop water requirement is then calculated by dividing the water flow rate available to the center pivot irrigation system by the number of gallons per minute per acre to achieve the crop requirement. The next step is to divide the number of acres available to receive sufficient water to achieve the crop water requirement by the number of acres of the field to determine the percentage thereof. The percentage is then multiplied by the number of irrigation sectors or zones to identify the number of irrigation sectors or zones available for the crop water requirement. The top yielding sectors or zones in the field are then identified corresponding to the number of irrigation sectors or zones available for the crop water requirement. The final step is then irrigating only those top yielding sectors or zones.

The method described above may also be complimented by increasing the seed population in those sectors or zones having higher yield potential to achieve maximum yield potential.

It is a principal object of the invention to provide an improved method of controlling the irrigation of a field during times of drought or during times of reduced water availability with a center pivot irrigation system.

A further object of the invention is to compliment the method described above with the step of varying the seed population in different sectors or zones of the field depending upon their yield potential.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
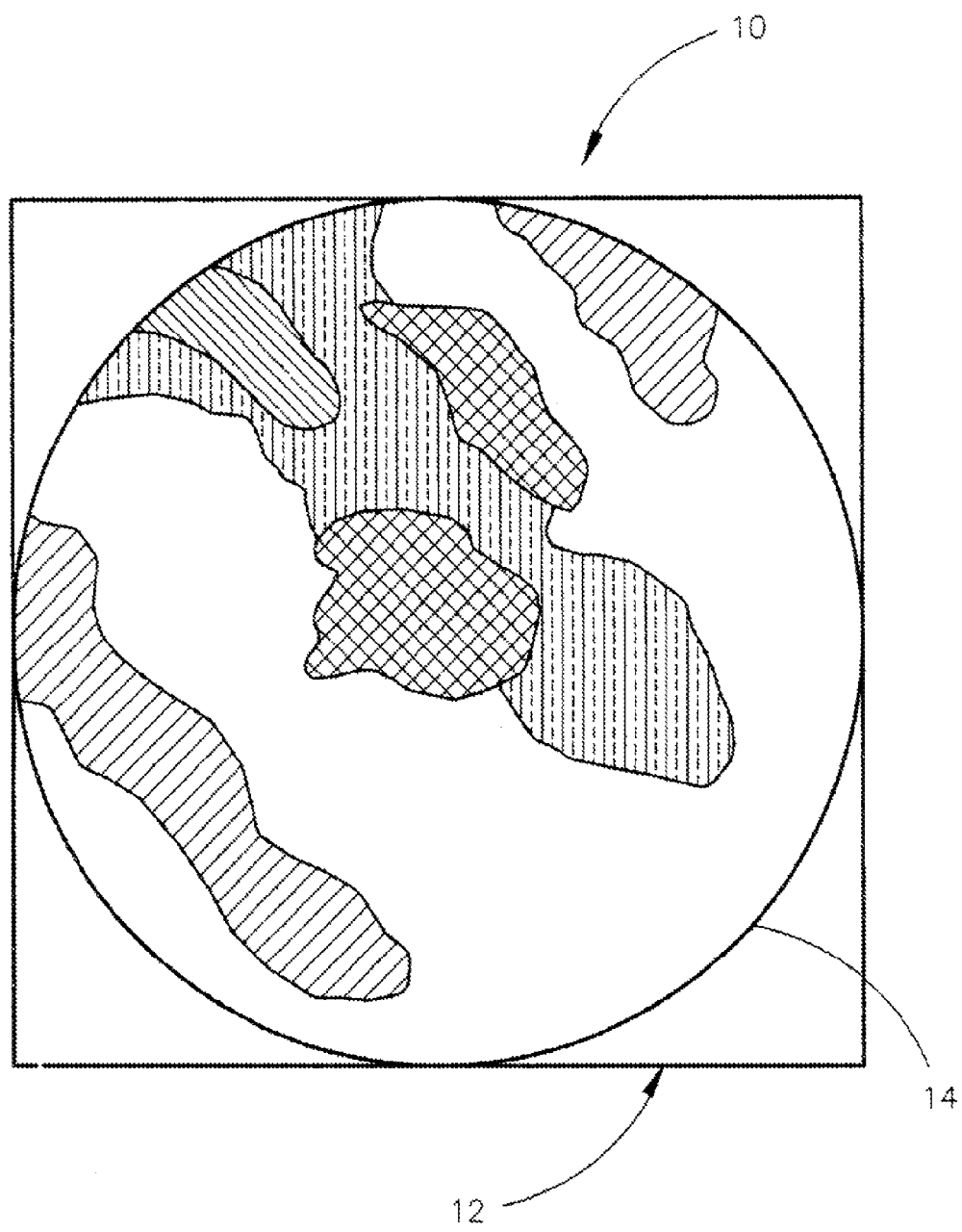
FIG. 1 is a map of a field which illustrates the yield potentials of the field which is irrigated by a center pivot irrigation system.
Figure 2:
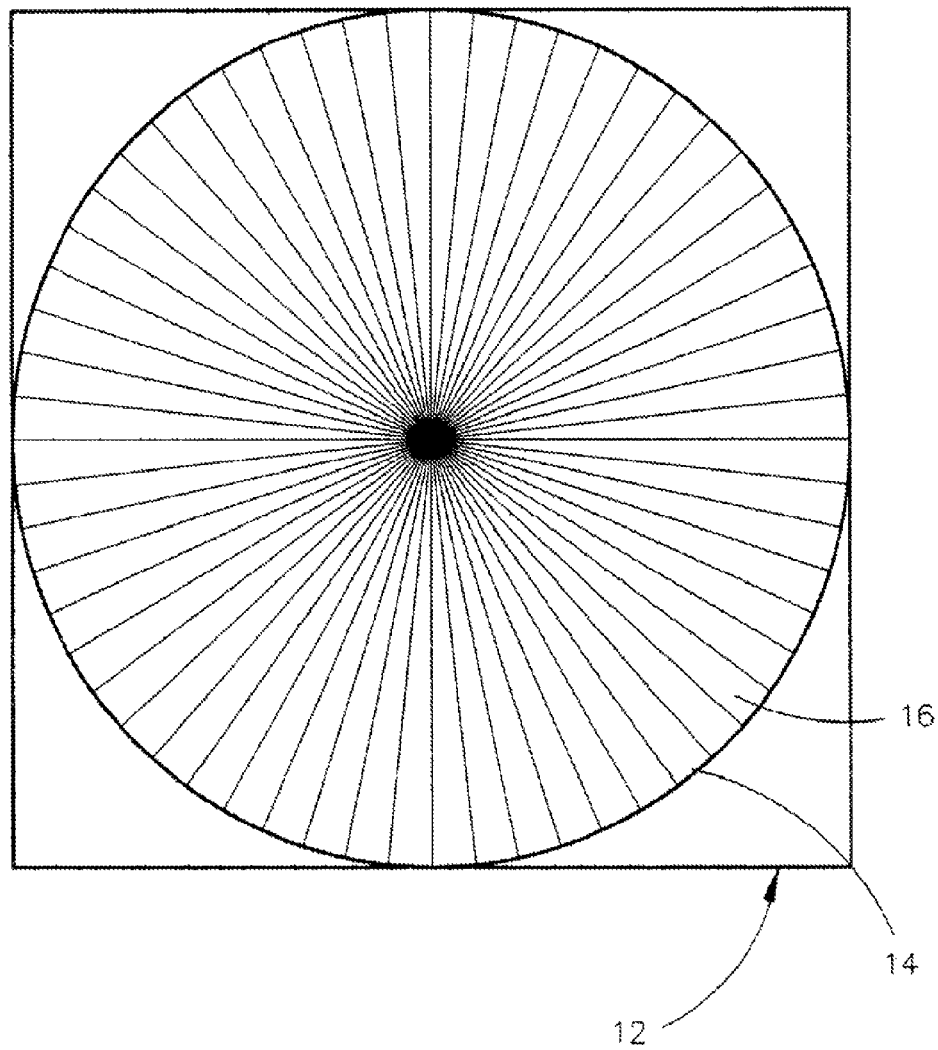
FIG. 2 is a map which divides the field into individual sectors.

In FIG. 1, the numeral 10 refers to a map generated by software which illustrates the yield potentials of the field 12 which is irrigated by a center pivot irrigation system. The center pivot irrigation system irrigates a circular portion 14 of the field 12. The map of FIG. 1 is derived from an analysis of GIS (geographic information system) data layers such as EM (electromagnetic) or EC (electrical conductivity), topography, yield, aerial imagery, satellite imagery or any combination of the same. In one method of this invention, software is then utilized to divide the circular portion 14 of the field 12 into sectors 16, the number of which is optional. As will be described hereinafter, software could be utilized to divide the circular portion 14 into zones rather than sectors. For the purpose of describing the instant invention, the circular portion 14 of the field will be assumed to be 122 acres with the circular portion 14 of the field 12 being divided into 60 sectors. It will also be assumed for purposes of illustration, that the center pivot flow rate is 425 gpm (gallons per minute). It will further be assumed that the crop water requirement is 0.31" application depth. The single sector size is 6 degrees or 2.03 acres. It will take 5.8 gpm/acre to achieve 0.31" application depth.

Software is then used to calculate the average yield potential by sector and then rank each individual sector by highest average yield potential to identify the most optimal sectors.

The next step in the method of this invention is to divide 425 gpm by 5.8 gpm/acre which results in 73 acres of the 122 acre field being available for 0.31" application depth. The total acres of 122 is then divided by 73 available acres which equals 60%. The 60% amount and the 60 total sectors are then multiplied which results in 36 sectors being available for 0.31" application depth. The top yielding 36 sectors are then identified. Variable rate prescriptions are generated to manage 0.31" application depth in those 36 sectors with the remaining 24 sectors not being irrigated.

Figure 3:
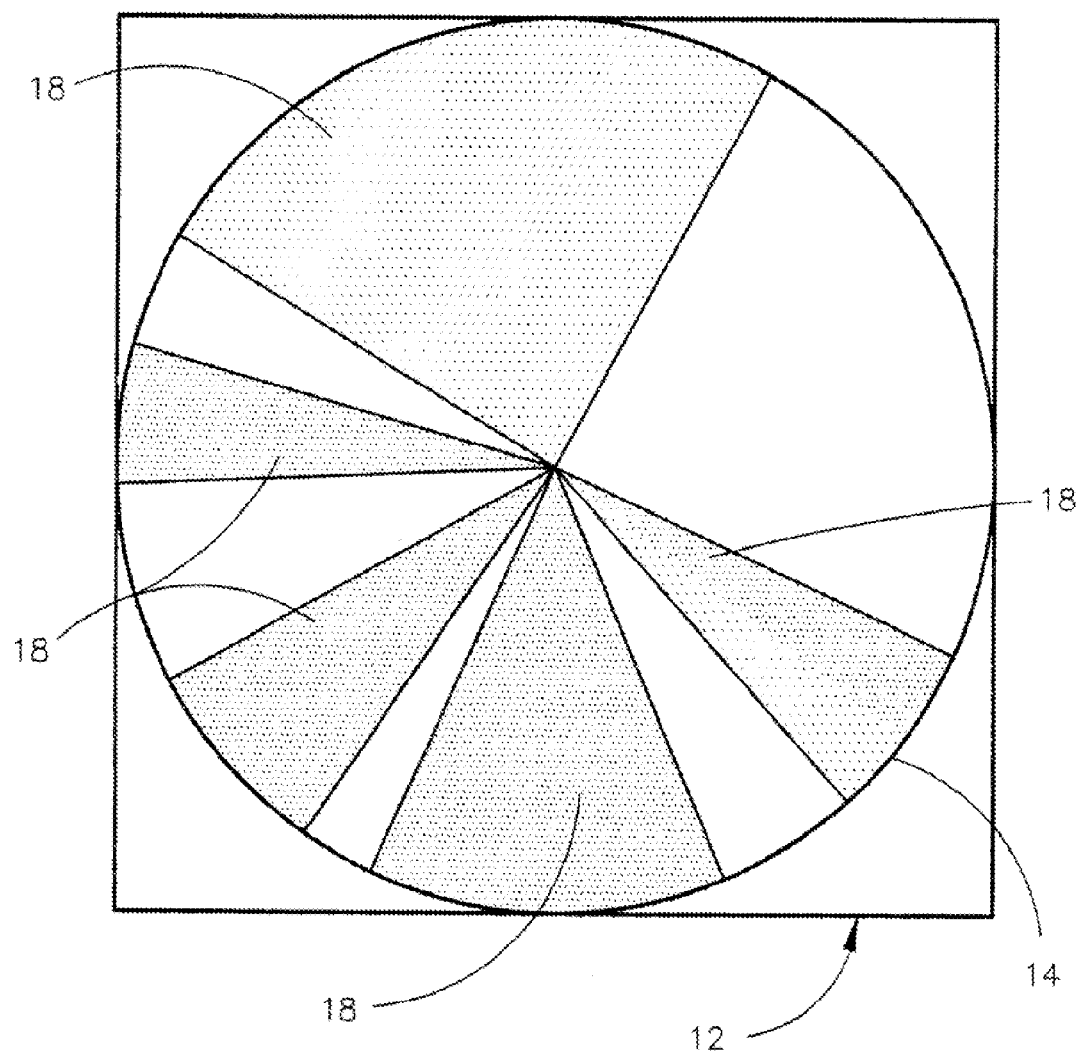
FIG. 3 is a map which indicates which sectors or zones of the field are to be irrigated.

A computer control system is utilized to activate the sprinklers on the center pivot irrigation system when the center pivot irrigation system is passing over each of the selected 36 sectors or zones. The sprinklers on the center pivot irrigation system are not activated when the center pivot irrigation system is passing over the other 24 sectors or zones thereby ensuring that the top 36 yield potential sectors will receive sufficient water to achieve the 0.31" application depth requirement thereby ensuring that those 36 sectors will receive enough water to produce a crop. Those sectors are identified by the reference numeral 18 in FIG. 3.

The software will automatically change the amount of water being supplied to the field depending on in-season precipitation. If the amount of irrigation water increases from the initial flow rate, additional sectors may be added to the 36 figure.

Further, the amount of water applied to portions of each sector or zone may be varied by controlling each sprinkler or banks of sprinklers along the length of the irrigation system as the irrigations system moves through individual sectors or zones.

An optional step in the method of this invention is that when the top 36 sectors are identified, the seed population of those 36 sectors may be increased to further enhance the yield potential of those 36 sectors.

If the field is divided into zones rather than sectors, the most productive zones would be determined and numerically ranked. The sprinklers or banks of the sprinklers will be activated to only irrigate those zones having the highest yield potential. For example, in one sector the yield potential may vary from the inner end of the sector to the outer end of the sector. The sprinklers along the length of the irrigation system will be turned off when passing over a zone of less yield potential and will be turned on when passing over a zone of greater yield potential.

Thus it can be seen that the method of this invention accomplishes at least all of the stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. The method of irrigating a field during times of drought and during times of reduced water availability with an elongated center pivot irrigation system, having spaced-apart sprinklers thereon, comprising the steps of:

determining the number of acres of a field over which the center pivot irrigation system travels;

preparing a map which divides a field into irrigation sectors;

determining the number of acres in each of the irrigation sectors;

determining a yield potential of a field in each of the irrigation sectors;

determining a crop water requirement;

determining a water flow rate, in gallons per minute, available to the center pivot irrigation system;

determining a number of gallons per minute per acre to achieve the crop water requirement;

calculating the number of acres available to receive sufficient water to achieve the crop water requirement by dividing the water flow rate available to a center pivot irrigation system by the number of gallons per minute per acre to achieve the crop water requirement;

dividing the number of acres available to receive sufficient water to achieve the crop water requirement by the number of acres of the field to determine a percentage thereof;

multiplying the percentage and a total number of irrigation sectors to identify the number of irrigation sectors available for the crop water requirement;

identifying the top yielding sectors in the field corresponding to the number of irrigation sectors available for the crop water requirement;

moving the center pivot irrigation system over the field;

and operating the sprinklers on the center pivot irrigation system as the center pivot irrigation system moves over the top yielding sectors to irrigate those top yielding sectors.

2. The method of claim 1 wherein the top yielding sectors are planted with a greater seed population.

3. The method of claim 1 wherein the amount of water applied to portions of each sector is varied by controlling the sprinklers along the length of the center pivot irrigation system as the center pivot irrigation system moves through individual top yielding sectors.

4. The method of irrigating a field during times of drought and during times of reduced water availability with an elongated center pivot irrigation system, having sprinklers along the length thereof, comprising the steps of:

determining the number of acres of a field over which a center pivot irrigation system travels;

preparing a map which divides a field into irrigation zones;

determining the number of acres in each of the irrigation zones;

determining a yield potential of a field in each of the irrigation zones;

determining a crop water requirement;

determining a water flow rate, in gallons per minute, available to a center pivot irrigation system;

determining the number of gallons per minute per acre to achieve a crop water requirement;

calculating the number of acres available to receive sufficient water to achieve a crop water requirement by dividing the water flow rate available to a center pivot irrigation system by the number of gallons per minute per acre to achieve a crop water requirement;

dividing the number of acres available to receive sufficient water to achieve a crop water requirement by the number of acres of a field to determine the percentage thereof;

multiplying the percentage and the total number of irrigation zones to identify the number of irrigation zones available for a crop water requirement;

identifying a top yielding zone in a field corresponding to the number of irrigation zones available for a crop water requirement;

moving the center pivot irrigation system over the field;

and operating the sprinklers on the center pivot irrigation system on the center pivot irrigation system moves over the top yielding zones to irrigate those top yielding zones.

5. The method of claim 4 wherein the top yielding zones are planted with a greater seed population.

6. The method of claim 4 wherein the amount of water applied to portions of each zone is varied by controlling the sprinklers on the center pivot irrigation system as the center pivot irrigation system moves through individual top yielding zones.

\* \* \* \* \*